Figures 1, 2:
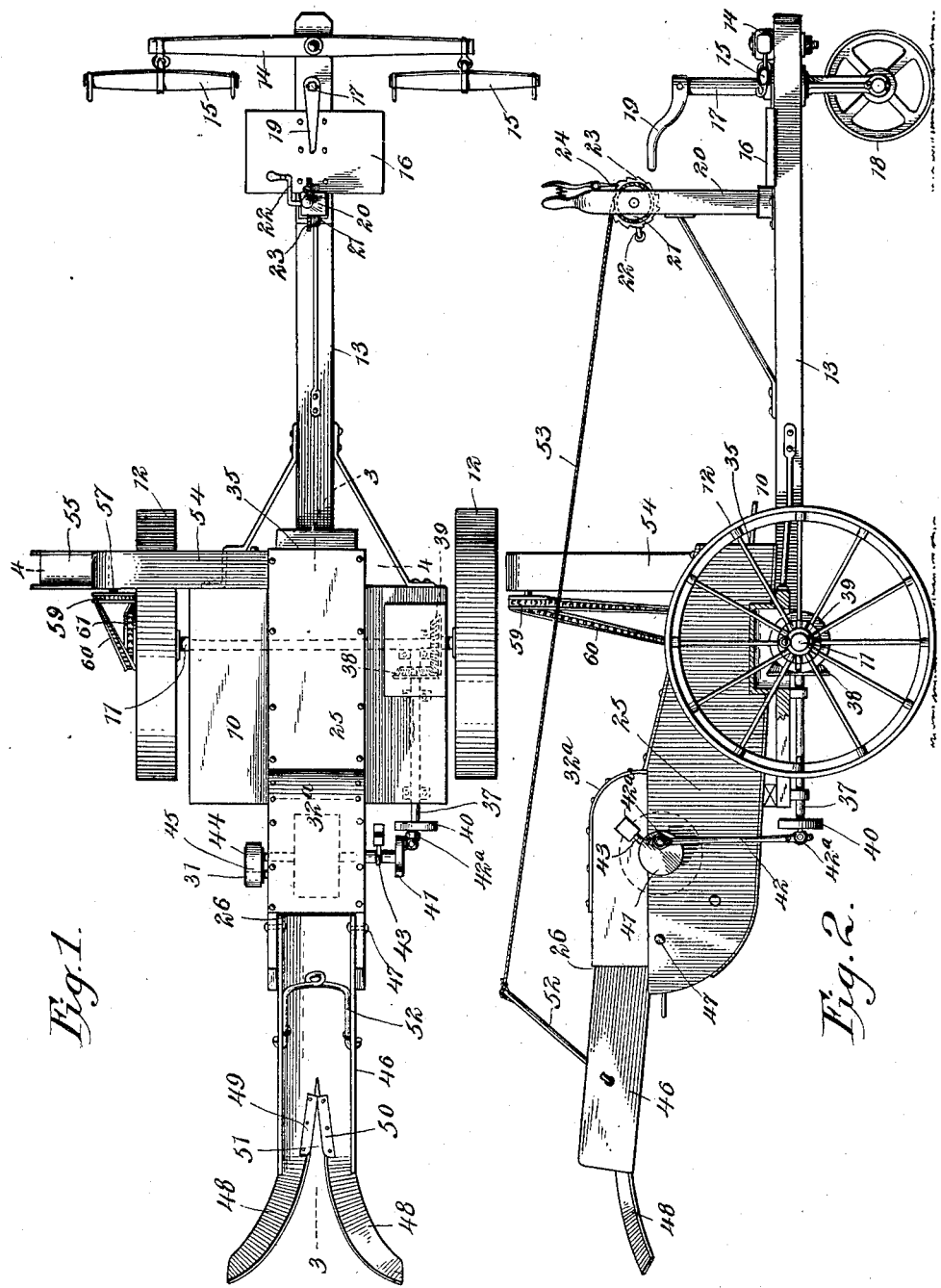

No. 660,621. Patented Oct. 30, 1900.
C. L. CORRELL.
COMBINED HEADER AND THRESHER.
(Application filed Dec. 2, 1899.)

(No Model.) 2 Sheets—Sheet 1.

Witnesses Clarence L. Correll, Inventor.
By his Attorneys,

No. 660,621. Patented Oct. 30, 1900.
C. L. CORRELL.
COMBINED HEADER AND THRESHER.
(Application filed Dec. 2, 1899.)
(No Model.) 2 Sheets—Sheet 2.
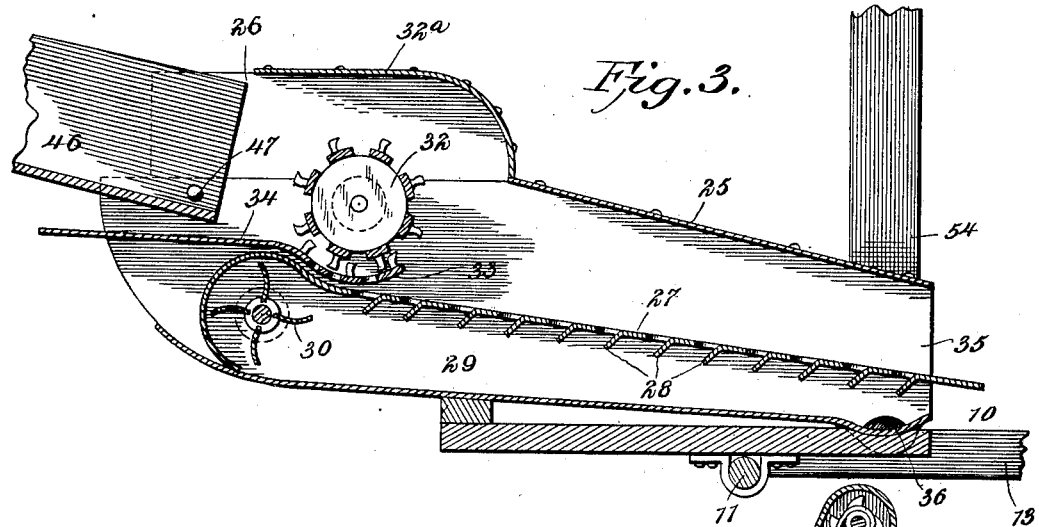
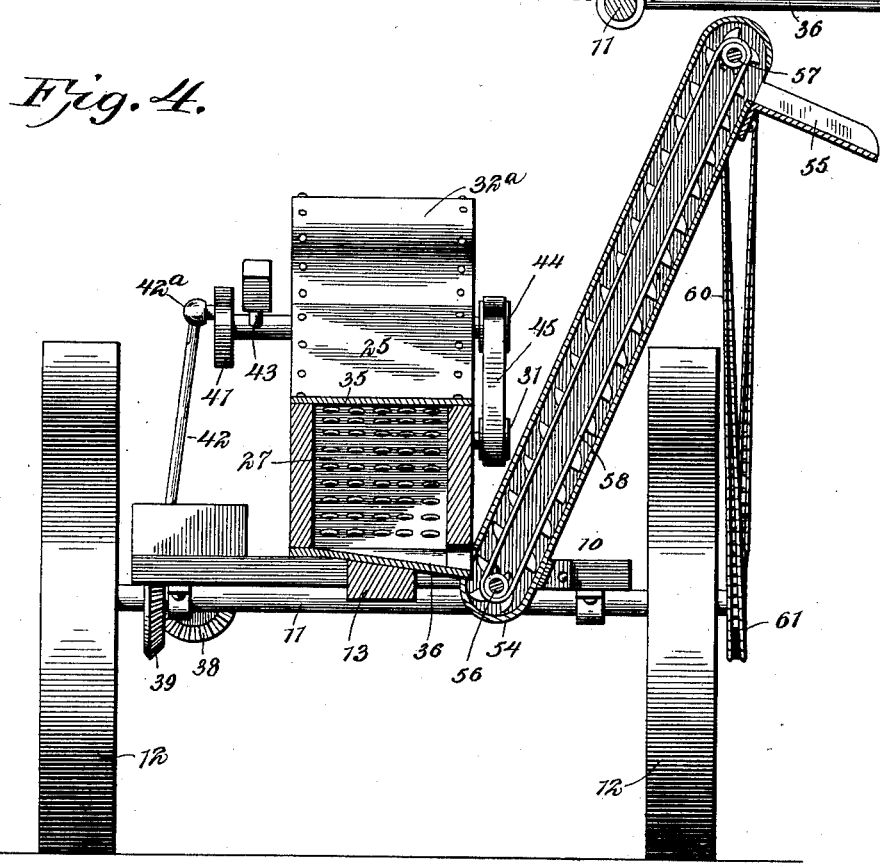
Witnesses
Howard D. Orr.
H. J. Benhof
Clarence L. Correll, Inventor.
By his Attorneys,
C. A. Snow & Co.

UNITED STATES PATENT OFFICE.

CLARENCE L. CORRELL, OF BURNS, KANSAS.

COMBINED HEADER AND THRESHER.

SPECIFICATION forming part of Letters Patent No. 660,621, dated October 30, 1900.

Application filed December 2, 1899. Serial No. 739,003. (No model.)

*To all whom it may concern:*

Be it known that I, CLARENCE L. CORRELL, a citizen of the United States, residing at Burns, in the county of Marion and State of Kansas, have invented a new and useful Combined Header and Thresher, of which the following is a specification.

My invention relates to a combined header and thresher especially adapted for harvesting Kafir corn and kindred grain which is planted in rows; and one object in view is to provide a simple structure which embodies devices for cutting the heads of the grain, delivering the same to a threshing mechanism, separating and cleaning the grain from the chaff and refuse, and delivering the grain to a suitable vehicle.

A further object is to provide means for adjusting the harvester devices to cut the heads of the standing grain at different heights and to provide means for conveniently steering or guiding the machine, so as to keep the cutter devices in alined position with relation to the row of grain.

With these ends in view the invention consists in the novel combination of mechanisms and in the construction and arrangement of the parts for service, as will be hereinafter fully described and claimed.

In the drawings, Figure 1 is a plan view of my improved header and thresher. Fig. 2 is a side elevation thereof, with a part of the platform or frame broken away to illustrate the gearing which drives the shaft for the propulsion of the threshing mechanism. Fig. 3 is a sectional elevation taken longitudinally through the threshing mechanism and adjunctive parts of the harvester, the plane of the section being indicated by the dotted line 3 3 on Fig. 1. Fig. 4 is a vertical transverse section taken in the plane of the dotted line 4 4 on Fig. 1.

The same numerals of reference are used to indicate like and corresponding parts in each of the several figures of the drawings.

The platform or frame 10 of my combined harvester and thresher is supported by a driving-axle 11, which is equipped with carrying-wheels 12, which are made fast with the axle by any suitable means for the purpose of rotating said axle on the advancement of the machine. The draft-team walks in rear of the machine, so as to push the latter across the field, and to this end I provide the pusher-beam 13, which is joined with the frame or platform in any suitable way and extends rearwardly therefrom a suitable distance. This pusher-beam is arranged in the central line of the machine, and to its rear end is connected a doubletree 14, the latter having singletrees 15, to which the team may be hitched. A standing-platform 16 is made fast with the pusher-beam at a suitable point in front of the doubletree, on which platform the driver is adapted to stand; but in lieu of the platform a seat may be provided for the accommodation of the driver. A vertical steering-spindle passes loosely through the pusher-beam, so as to turn freely therein. This spindle carries a caster-wheel 18 at its lower end, while the upper end of the spindle is provided with a handle 19, the same being within convenient reach of the driver. The caster-wheel is adapted to ride upon the ground, so that the spindle and the wheel will serve to sustain the weight imposed on the pusher-beam, and this spindle may be adjusted by manipulation of the handle for the purpose of changing the angle of the caster-wheel to the lontudinal plane of the pusher-beam and the machine, whereby the machine may be steered and guided in a direction to present the cutter mechanism of the harvester to the standing grain.

A post 20 is secured firmly to the pusher-beam close to the platform and the steering-spindle, and in this post is mounted a drum 21, around which may be coiled a rope or cable 53, provided for the adjustment of a pivoted grain-chute, to be hereinafter described. This drum is provided with a crank 22 for its convenient adjustment by the driver, and on the drum is secured a ratchet 23, the latter adapted to be engaged by a pawl 24, which is mounted on the post 20, thus making provision for holding the drum against rotation and supporting the grain-chute in its adjusted position.

The frame or platform 10 of the machine is equipped with a threshing mechanism which is adapted to receive the grain directly from the grain-chute. In the embodiment of the invention shown by the drawings the operating parts of the threshing mechanism are housed or contained within a casing 25 of any suitable construction. This casing is arranged longitudinally of the machine, and in the center thereof and at its front end the casing is formed with a feed-mouth 26. A screen or riddle 27 is arranged longitudinally of the casing, preferably in a position inclined downwardly toward the rear of the machine. The screen or riddle is preferably of sheet-metal construction, with a multiplicity of holes punched therein to produce a series of inclined depending lips 28, as more clearly shown by Fig. 3, said lips serving to deflect the blast upwardly into the refuse-chamber of the casing 25 and to permit the grain to pass into the blast-chamber 29. The screen or riddle divides the casing 25 into longitudinal chambers, the upper of which is adapted to contain the grain and chaff, while the lower chamber 29 receives the blast from a fan or blower 30. This fan is located in the lower chamber at the front part of the casing 25, and one end of the fan-shaft is extended beyond the casing for the reception of the pulley 31. The threshing-cylinder 32 is arranged in the upper chamber of the casing, so as to be partly housed by an ordinary cylinder-cap 32ª. A concave 33 is in operative relation to the cylinder, and the grain is delivered from the grain-chute to this concave by a feed-board 34. The concave and the cylinder are provided with ordinary threshing teeth or spikes, and the front end of the screen or riddle 27 is extended below the concave, so that the threshed grain will be discharged directly from the concave upon the inclined screen or riddle. The chaff and heads of the grain are retained on the screen or riddle, while the grain itself is free to pass through the openings in the riddle, so as to drop upon the inclined bottom of the casing, thus exposing the grain to the action of the blast and blowing the chaff out of the grain. The casing is provided at its rear end with an outlet 35, which is in rear of the frame or platform 10, so that the chaff, stalks, and other refuse will be discharged from the screen or riddle at the rear end of the casing. The grain rolls or flows along the inclined bottom of the casing or chamber 29 into a transverse trough 36 at the lower side and rear end of the casing, from which trough the cleaned grain is discharged into an elevator. The cylinder is driven by power connections with the axle of the machine, one element of said power mechanism being a driving-shaft 37, which is arranged on the platform or frame to one side of and below the threshing-casing. One end of this shaft is provided with a beveled gear 38, which meshes with a beveled gear 39 on the axle 11. The opposite front end of this driving-shaft is provided with a crank-disk 40, which is disposed immediately below the crank-disk 41 on one end of the cylinder-shaft. The crank-disks on the driving-shaft and the cylinder-shaft are disposed at right angles to each other, and the disks are connected operatively by a pitman 42, each end of which is connected with the disk by a ball-and-socket connection 42ª, which serves the purposes of a wrist-pin and enables the pitman to have the necessary play due to the angular disposition of the crank-disks to each other, while at the same time transmitting the motion of the driving-shaft to the cylinder-shaft. A weighted arm 43 is made fast with the cylinder-shaft to occupy a different radial position thereto than the wrist-pin or the ball-and-socket connection for the pitman to the crank-disk 41, and this weighted arm serves as a fly-wheel to overcome the dead-center of the wrist-pin on said crank-disk 41, thus tending to insure regularity in the rotation of the cylinder-shaft. The other end of the cylinder-shaft is provided with a belt-pulley 44, around which passes an endless belt 45, that extends to and around the pulley 31 on the fan-shaft, said belt transmitting power from the cylinder-shaft to the fan for the operation of the latter.

One of the important features of my machine is the harvesting or grain chute 46, which projects from the front end of the casing 25 and is arranged in an inclined position with relation to the threshing mechanism. This chute is fitted at its rear end in the mouth 26 of the casing 25, and it is pivotally supported therein by the bolts or pins 47, thus mounting the chute for adjustment on a horizontal axis. The free protruding end of the chute is equipped with gathering fingers or plates 48, which may be made integral with the bottom of the chute or fastened securely thereto in any approved way. These fingers or plates have the inner edges or faces thereof curved reversely to each other, so that they will converge toward the rear while their front ends are spaced, thus forming a tapering throat or space between the plates. The cutter-plates 49 50 are secured to the gathering-plates or the bottom of the chute 46 on opposite sides of the space between the plates, so that the cutters will converge toward the rear ends thereof, and on the advancement of the machine the heads of the standing grain will be gathered by the plates 48, so as to be directed into the crotch 51, between the cutters, thus presenting the stalks to the cutting devices for severance thereby. The cut stalks, with the heads of the grain, lodge upon the chute 46, and by the inclination of the latter the grain thus harvested is caused to travel by gravity to the feed-board 34, and thence to the thresher mechanism. It will be observed that the thresher mechanism is disposed at the lower rear end of the harvesting-chute and on a lower plane than the bottom of the rear end thereof, so that the grain which travels by gravity down the harvesting-chute passes therefrom directly into the thresher mechanism. The harvesting or grain chute 46, which carries the cutter mechanism, may be adjusted to different positions for operation on the grain of different heights. This adjustment is effected by the cable or rope 53 and the drum 21, the front end of said cable being fastened to a bail 52, which is attached to the sides of the pivoted chute 46.

54 designates an elevator-casing which is arranged in an upright position at the rear part of the frame or platform 10. Said casing or boot is inclined, as shown more clearly by Fig. 4, so as to make its lower end adjacent to the trough 36 of the casing, and at the upper end of the boot is secured a discharge-spout 55. An idler-shaft 56 is journaled in the foot of the elevator-boot while the driving-shaft 57 is in the upper end of said boot. The elevator is preferably in the form of an endless belt having a series of cups or buckets, said elevator being indicated by the numeral 58 and fitted on the driving and idler shafts. The shaft 57 is provided at one end with a chain-wheel 59, around which passes an endless driving-chain 60, and on the axle 11 or one of the carrying-wheels is secured a chain-wheel 61, which gives motion to the endless chain.

The operation may be described as follows: The grain-chute having been properly adjusted to the height of standing grain, the machine is pushed across the field by the team hitched to the draft appliance and the driver steers the machine by manipulating the handle of the spindle so as to present the chute in alinement with the row of standing grain. On the advancement of the machine the heads of the stalks are severed by the knives, and they lodge upon the inclined chute. The severed heads of grain gravitate along the chute until they are brought within the sweep of the cylinder, and the grain is thus threshed by the action of the teeth or spikes on the cylinder and the concave. The threshed grain is discharged upon the inclined screen or riddle, which retains the stalks and chaff, while the grain is free to pass through the openings in the riddle into the chamber 29. The stalks, chaff, and other refuse are discharged through the outlet 35, but the cleaned grain is delivered by the trough 36 to the elevator, which lifts the grain and discharges the same into a vehicle alongside of the harvester or into suitable receptacles.

The frame 10 of my machine and the driving mechanism for the cylinder resemble somewhat the frame and driving mechanism of a mowing-machine, and as a matter of fact my harvester may be mounted on the frame of the mower and the proper driving devices supplied thereto, thus saving the farmer the expense of two separate machines.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

I would have it distinctly understood that the means for harvesting and threshing grain of the class specified may be employed in connection with mowing-machines by removing the tongue, the side bar, levers, and such parts of the mower as are not necessary in my machine and by applying the improvements of my invention upon the frame of the mower, the necessary driving appliances being connected with the axle for propulsion thereby.

Having thus described the invention, what I claim is—

1. A harvester for Kafir corn comprising a supporting-frame having a push-beam projecting rearward therefrom, a supporting-wheel in a steering-yoke mounted in the push-beam, the forward-extending harvesting-chute disposed in line with the push-beam and pivotally supported at its rear end, the bottom of the said harvesting-chute having rearward-converging cutter-plates at its front end and forward-projecting guide-fingers leading to said cutter-plates, a winch on the push-beam and connections between said winch and the front portion of the harvesting-chute, whereby the front end of the latter may be raised and lowered, in combination with a thresher mechanism at the rear lower end and on a lower plane than the bottom of the said rear end of the said chute, substantially as described.

2. In a harvester for Kafir corn, a harvesting-chute pivoted at its rear end and thereby adapted for vertical adjustment at its front end, the bottom of said chute having rearward-converging cutter-plates at its front end and forward-projecting guide-fingers leading to said cutter-plates, in combination with a thresher mechanism disposed at the rear end of said harvesting-chute and in a lower plane than the bottom of the rear end thereof, whereby the grain is discharged from said harvesting-chute to said thresher mechanism, substantially as described.

3. A combined header and thresher comprising a frame, a threshing mechanism thereon, the cylinder of which is provided with a crank-disk, the driving-shaft also provided with a crank-disk, a pitman having ball-and-socket connections with the crank-disks of the driving-shaft and the cylinder-shaft, a gathering-chute inclined toward the threshing mechanism for delivering its contents directly thereto, and a cutter mechanism carried by the gathering-chute, substantially as described.

In testimony that I claim the foregoing as my own I have hereto affixed my signature in the presence of two witnesses.

CLARENCE L. CORRELL.

Witnesses:
G. W. RICKENS,
W. S. SMALLRIDGE.